United States Patent
Lupo et al.

(10) Patent No.: US 8,135,517 B2
(45) Date of Patent: Mar. 13, 2012

(54) TORQUE CONTROL METHOD OF A ROAD VEHICLE

(75) Inventors: Savino Luigi Lupo, Bologna (IT); Gabriele Serra, San Lazzaro di Savena (IT); Filippo Para, Bologna (IT)

(73) Assignee: Magneti Marelli Powertrain S.p.A., Corbetta (IT)

( * ) Notice: Subject to any disclaimer, the term of this patent is extended or adjusted under 35 U.S.C. 154(b) by 901 days.

(21) Appl. No.: 12/179,292

(22) Filed: Jul. 24, 2008

(65) Prior Publication Data

US 2009/0093937 A1    Apr. 9, 2009

(30) Foreign Application Priority Data

Jul. 25, 2007  (EP) .................................... 07425459

(51) Int. Cl.
    *G06F 17/00* (2006.01)
(52) U.S. Cl. .................. 701/48; 701/1; 701/22; 701/36; 701/51; 180/65.1; 180/65.21; 180/65.235; 303/112; 477/14; 477/15; 477/70; 477/77
(58) Field of Classification Search .................. None
    See application file for complete search history.

(56) References Cited

U.S. PATENT DOCUMENTS

| | | | |
|---|---|---|---|
| 6,278,915 B1 * | 8/2001 | Deguchi et al. .................. 701/22 |
| 6,405,701 B1 * | 6/2002 | Masberg et al. ........... 123/192.1 |
| 6,546,910 B2 * | 4/2003 | Tanaka et al. .................. 123/348 |
| 6,740,002 B1 * | 5/2004 | Stridsberg ........................ 477/14 |
| 7,424,937 B2 * | 9/2008 | Henry et al. ..................... 188/156 |
| 7,565,938 B2 * | 7/2009 | Hisada et al. ................. 180/65.1 |
| 7,739,016 B2 * | 6/2010 | Morris ............................. 701/51 |
| 2002/0134637 A1 * | 9/2002 | Salecker et al. ............. 192/54.1 |
| 2004/0204286 A1 * | 10/2004 | Stridsberg ........................ 477/14 |
| 2005/0283283 A1 * | 12/2005 | Hisada et al. .................... 701/22 |
| 2006/0030979 A1 * | 2/2006 | Kuang et al. ..................... 701/22 |
| 2007/0043496 A1 * | 2/2007 | Ogawa ............................. 701/53 |
| 2007/0225886 A1 * | 9/2007 | Morris ............................. 701/51 |

* cited by examiner

*Primary Examiner* — Khoi Tran
*Assistant Examiner* — Jonathan L Sample
(74) *Attorney, Agent, or Firm* — Woodcock Washburn LLP

(57) ABSTRACT

A control method of the torque of a road vehicle having a powertrain system provided with an engine and a driveline which transmits the torque generated by the engine to the road surface; the method contemplates the steps of: determining a target torque; modeling the powertrain system as a single physical component which presents a characteristic mechanical inertia and a characteristic torsional elasticity; determining a current load torque of the vehicle; determining a target torsion of the powertrain system according to the target torque and the current load torque; determining a current torsion of the powertrain system and a current torsion speed of the powertrain system; determining a requested torque on the basis of the energy balance according to the target torsion, the current torsion, the current torsion speed, and the current load torque; and using the requested torque on the basis of the energy balance to control the torque generation of the engine.

10 Claims, 3 Drawing Sheets

TORQUE CONTROL METHOD OF A ROAD VEHICLE

CROSS-REFERENCE TO RELATED APPLICATIONS

This application claims priority to European Application No. 07425459.0 filed on Jul. 25, 2007.

TECHNICAL FIELD

The present invention relates to a torque control method of a road vehicle.

BACKGROUND

A road vehicle comprises a powertrain system, which is provided with an engine which generates a torque, and with a driveline which transmits the torque generated by the engine to the road surface; e.g. in a front-wheel drive car provided with an internal combustion engine, the driveline comprises a clutch, a gearbox, a differential, two axles shafts and two wheels each presenting a metallic rim supporting a rubber tire.

A powertrain system of a road vehicle presents a characteristic mechanical inertia and a characteristic torsional elasticity, i.e. to transmit the torque generated by the engine all the components of the powertrain system must undergo a torsional deformation or a torsion which may be more or less accentuated according to the mechanical features of each component. When a sudden variation in the torque transmission occurs (e.g. when the clutch is rapidly released with the gear engaged and the drive wheels have a good grip on the road surface), such a variation of the torque determines a corresponding variation in the longitudinal acceleration of the vehicle. Due to the torsional elasticity present in the powertrain system, a step variation of the torque triggers oscillations in the longitudinal vehicle acceleration about a final value which are progressively damped. Such oscillations in the longitudinal acceleration of the vehicle are damped rather rapidly (in the order of a few seconds); however, if not effectively counterbalanced, they are clearly perceived by the vehicle occupants and thus they are annoying.

In order to eliminate the oscillations in the longitudinal acceleration of the vehicle triggered by a variation of the torque generated by the engine, it has been suggested to implement a maximum damping algorithm in the torque control strategy. The use of a maximum damping algorithm is effective, because it is capable of either completely or nearly completely eliminating the oscillations in the longitudinal acceleration of the vehicle, but not very efficient, because it determines a considerable deceleration of the load increase of the transmission system, thus compromising the vehicle dynamic reactivity, in a manner perceivable by the driver.

SUMMARY

It is the object of the present invention to provide a control method of the torque of a road vehicle which is free from the above-described drawbacks and which is concurrently easy and cost-effective to implement.

According to the present invention, there is provided a control system of the torque of a vehicle as claimed in the attached claims.

BRIEF DESCRIPTION OF THE DRAWINGS

The present invention will now be described with reference to the accompanying drawings which illustrate a non-limitative embodiment thereof, in which.

DETAILED DESCRIPTION OF ILLUSTRATIVE EMBODIMENTS

Figure 1:
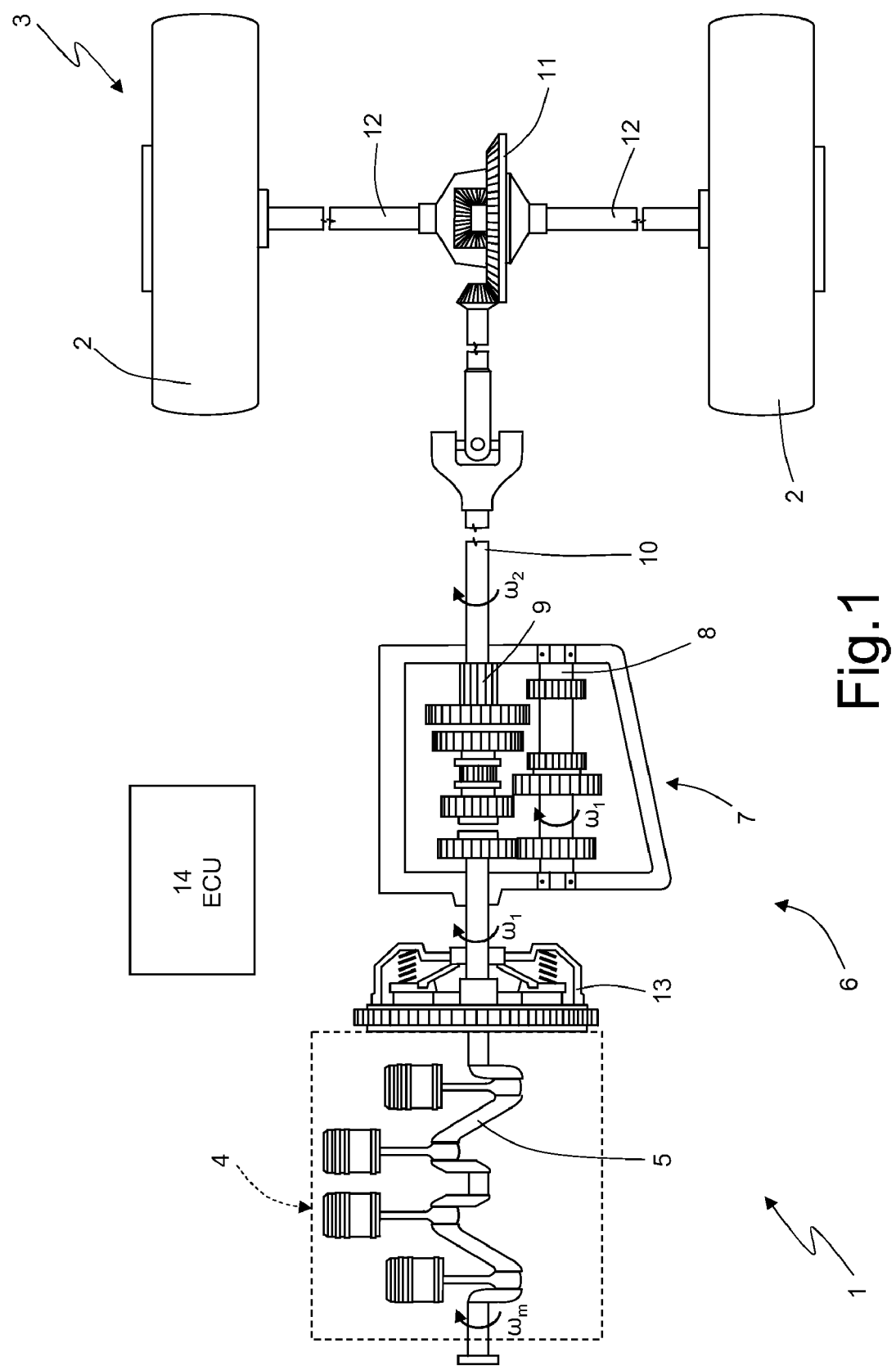
FIG. 1 is a diagrammatic view of a powertrain system of a rear-wheel drive car which implements the torque control method object of the present invention.

In FIG. 1, numeral 1 indicates as a whole a car provided with two front wheels (not shown) and two rear drive wheels 2 which receive the torque from a powertrain system 3.

The powertrain system 3 comprises an internal combustion engine, which is arranged in front position and is provided with a drive shaft 5 which rotates at an angular speed $\omega_m$, and a driveline 6 which transmits the torque generated by the internal combustion engine 4 to the road surface through the rear drive wheels 2. The driveline 6 comprises a mechanical gearbox 7 provided with a primary shaft 8 which rotates at an angular speed $\omega_1$ and is connectable to the drive shaft 5 and with a secondary shaft 9 which rotates at an angular speed $\omega_2$ and is connected to a propeller shaft 10 which transmits the motion to the rear drive wheels 2. The propeller shaft 10 ends with a differential 11, from which a pair of axle shafts 12 depart, each of which is integral with a rear drive wheel 2. Between the drive shaft 5 and the primary shaft 8 of the gearbox 7 there is interposed a servo-controlled plate clutch 13 to connect and disconnect the drive shaft 5 from the primary shaft 8 of the gearbox 7.

The powertrain system 3 further comprises an electronic control unit 14 (normally named ECU and diagrammatically shown), which controls the powertrain system 3 and drives the internal combustion engine 4 to adjust the torque generation.

Figure 2:
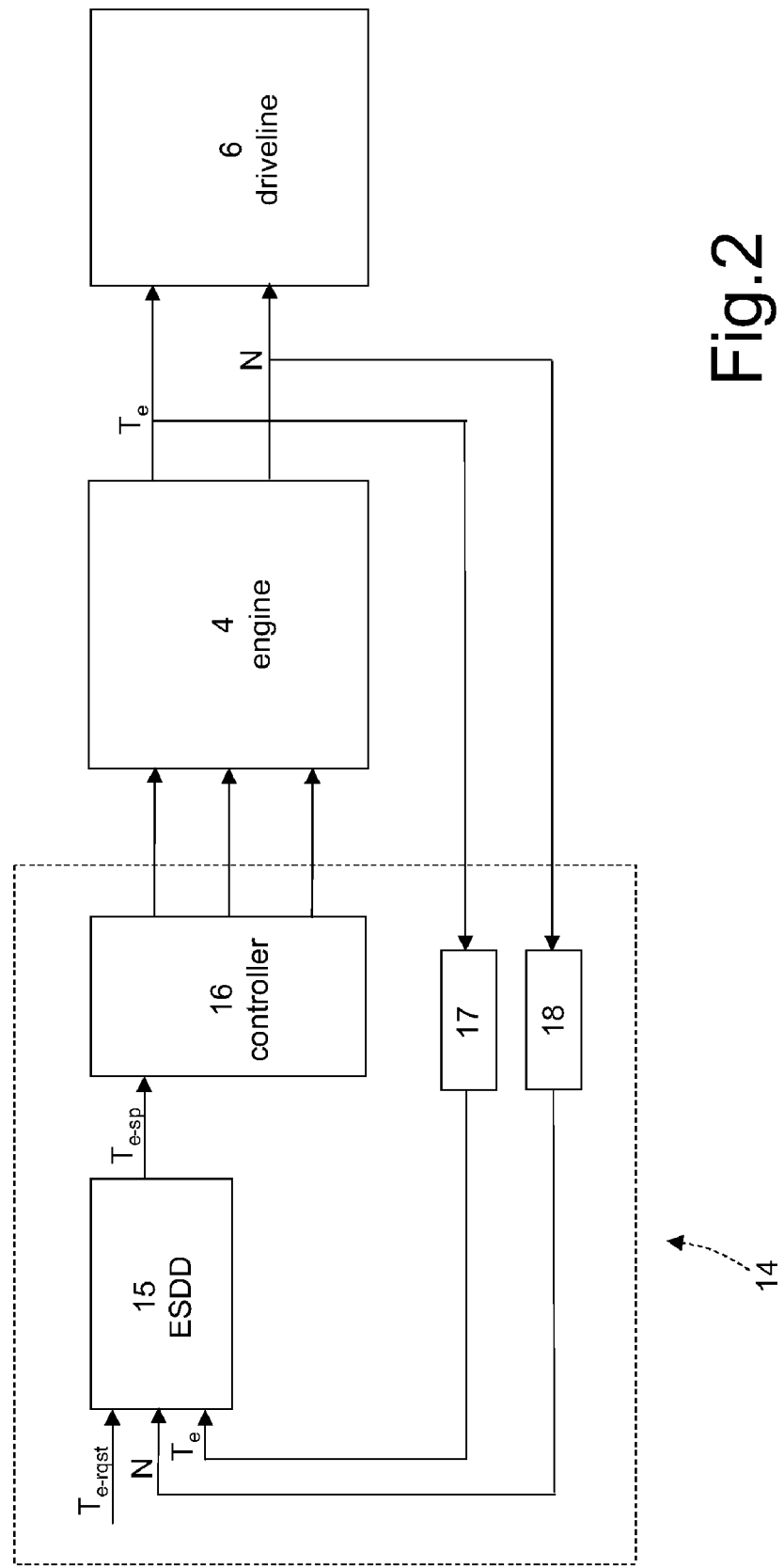
FIG. 2 is a block chart which shows the operation of a control unit of the powertrain system in FIG. 1.

As shown in FIG. 2, the electronic control unit 14 implements a control strategy of the torque generated by the internal combustion engine 4 which contemplates determining in a known manner a torque $T_{e\text{-}rqst}$ requested by the driver essentially according to the position of an accelerator pedal (alternatively, the torque $T_{e\text{-}rqst}$ may be requested by an automatic cruise control which replaces the driver). The requested torque $T_{e\text{-}rqst}$ is processed by a signal processing algorithm, which is implemented in a calculation block 15 (normally identified by the acronym ESDD—Energy Shaping Driveline Damping) and according to the requested torque $T_{e\text{-}rqst}$ determines the set-point torque $T_{e\text{-}sp}$ which represents the instantaneous torque which must be generated by the internal combustion engine 4; the set-point torque $T_{e\text{-}sp}$ is directly supplied to a controller 16, which adjusts the internal combustion engine 4 to make the internal combustion engine 4 itself generate the set-point torque $T_{e\text{-}sp}$.

The internal combustion engine 4 instantaneously delivers an effective torque $T_e$ at a number N of revolutions to the drive shaft 5; the effective torque $T_e$ generated by the internal combustion engine 4 is thus transmitted to the road surface by means of the driveline 6. The effective torque $T_e$ is estimated by means of a estimator 17 (known) and the number N of revolutions is measured by a specific sensor 18 (typically a phonic wheel); thus, the estimated/measured values of the effective torque $T_e$ and the number N of revolutions is transmitted as feedback to the calculation block 15 in which the signal processing algorithm which determines the set-point torque $T_{e\text{-}sp}$ is implemented.

Figure 3:
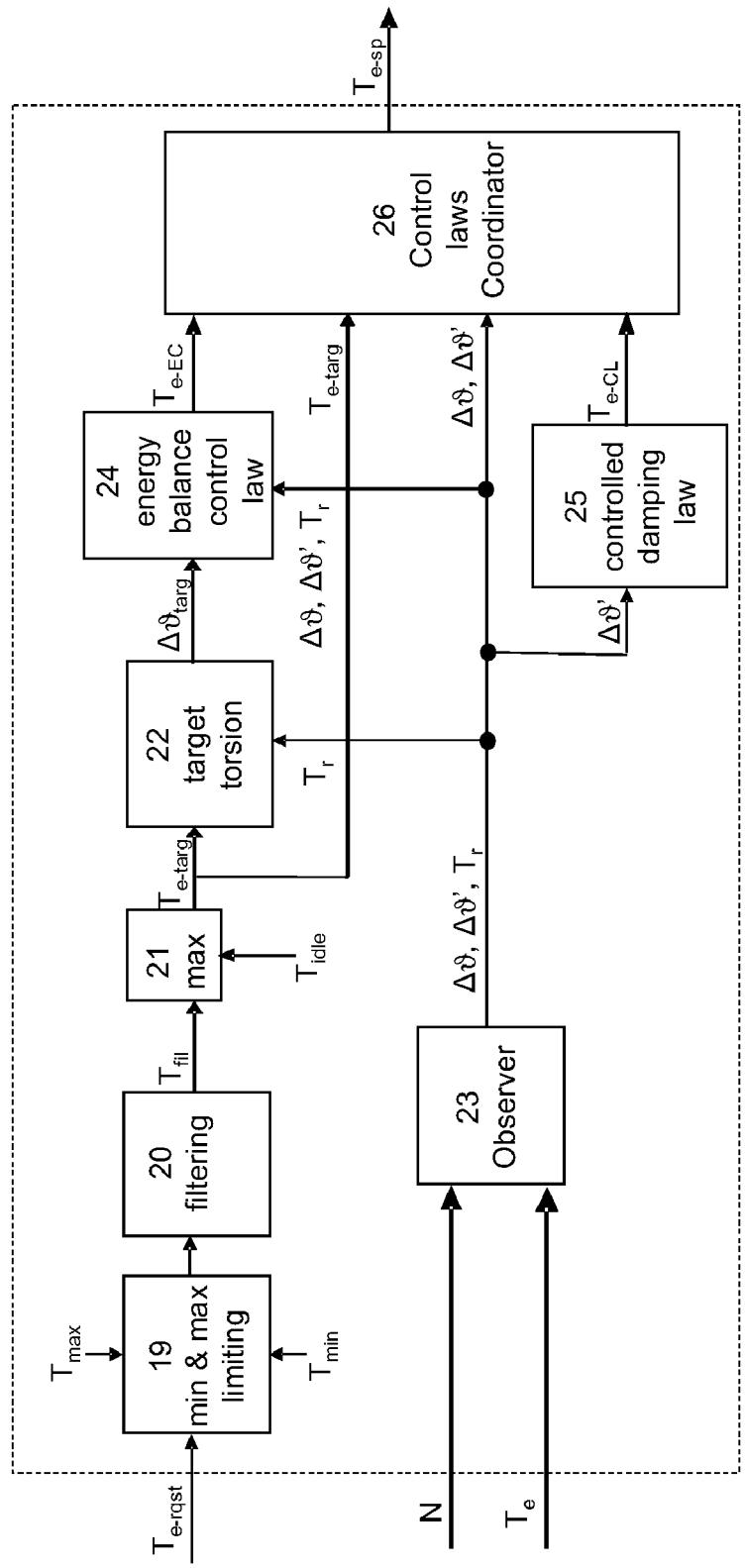
FIG. 3 is a further block chart which shows the operation of the control unit of the powertrain system in FIG. 1.

As shown in FIG. 3, the signal processing algorithm, which determines the set-point torque $T_{e\text{-}sp}$ and is implemented in the calculation block 15, contemplates processing the requested torque $T_{e\text{-}rqst}$ in a limiting block 19, in which the requested torque $T_{e\text{-}rqst}$ is limited within a range comprising a minimum torque $T_{min}$ (i.e. the minimum torque deliverable by the internal combustion engine 4) and a maximum torque $T_{max}$ (i.e. the maximum torque deliverable by the internal combustion engine 4). The minimum torque $T_{min}$ and the maximum torque $T_{max}$ values take into account the physical limits of the internal combustion engine 4 and may be variable according to the conditions of the internal combustion engine 4.

The output of the limiting block 19 is supplied to a filtering block 20, according to which a filtering of the low-pass type is performed to eliminate both the possible high-frequency noise and excessively rapid torque change requests not compatible with the physical response limits of the internal combustion engine 4 (typically from an automatic cruise control which replaces the driver). The filtering features depend on the type of transient (acceleration or deceleration of the car 1) and on a certain number of signals representing the state of the car (such as, for example, the transmission ratio engaged by the gearbox 7 and the number N of revolutions of the internal combustion engine 4).

The filtering block 20 provides the requested and filtered torque $T_{fil}$, which is processed by a maximum block 21 which outputs the maximum value between the requested and filtered torque $T_{fil}$ and an idling torque $T_{idle}$ which is supplied by an idle speed adjuster and represents the minimum torque value which must be delivered by the internal combustion engine 4 to maintain the required idling ratio and thus to avoid the undesired stopping or an undesired irregular operation of the internal combustion engine 4 itself. The output of the maximum block 21, i.e. the maximum between the requested and filtered torque $T_{fil}$ and the idling torque $T_{idle}$, represents the target torque $T_{e\text{-}targ}$ which represent the torque target which must be reached and maintained in stationary conditions (i.e. after exhausting the transient of oscillatory nature determined by the torsional elasticity of the powertrain system 3).

The target torque $T_{e\text{-}targ}$ is processed by a calculation block 22, which according to the target torque $T_{e\text{-}targ}$ determines the target torsion $\Delta\theta_{targ}$ of the powertrain system 3. In other words, the powertrain system 3 presents a characteristic mechanical inertia and a characteristic torsional elasticity, thus in order to transmit the torque generated by the internal combustion engine 4 all the components of the powertrain system 3 which must undergo a torsional deformation or torsion. In the algorithm implemented in the calculation block 22, the powertrain system 3 is modeled as a single physical component which presents a characteristic mechanical inertia and a characteristic torsional elasticity and which in order to transmit a certain torque must undergo a corresponding torsion; consequently, the calculation block 22 is capable of estimating what the target torsion $\Delta\theta_{targ}$ of the model of the powertrain system 3 should be in order to be able to transmit the target torque $T_{e\text{-}targ}$.

The target torsion $\Delta\theta_{targ}$ is calculated by means of the following equation:

$$\Delta\vartheta_{targ} = f_{Tw}^{-1}\left(\frac{J_v}{J_e + J_v} \cdot T_{e\text{-}targ} + \frac{J_e}{J_e + J_v} \cdot T_r\right)$$

$\Delta\theta_{targ}$ target torsion of the powertrain system 3 [rad];
$f_{Tw}(\Delta\theta)$ function which renders the elastic reaction torque of the powertrain system 3 [Nm];

$J_e$ moment of inertia of the internal combustion engine 4 transmitted to the drive shaft 5 [kg m$^2$];
$J_v$ moment of inertia of the car 1 transmitted to the drive shaft 5 [kg m$^2$];
$T_{e\text{-}targ}$ target torque [Nm];
$T_r$ current load torque of the car 1 transmitted to the drive shaft 5 [Nm].

In other words, the powertrain system 3 is modeled as a single physical components which presents a characteristic mechanical inertia and a characteristic torsional elasticity and which in order to transmit a certain torque must undergo a corresponding torsion; thus by exploiting such a model of the powertrain system 3 there is determined the function $f_{Tw}(\Delta\theta)$ which renders the elastic reaction of the powertrain system 3 according to the torsion $\Delta\theta$ of the model of the powertrain system 3. Finally, the inverse of the function $f_{Tw}(\Delta\theta)$ is determined in order to determine the target torsion $\Delta\theta_{targ}$ according to the target torque $T_{e\text{-}targ}$.

The current load torque $T_r$ of the car 1 is estimated by an observer 23, which receives as input the effective torque $T_e$ and the number N of revolutions and outputs, in addition to the current load torque $T_r$ of the car 1, also the current torsion $\Delta\theta$ of the powertrain system 3 and the current torsion speed $\Delta\theta'$ of the powertrain system 3 (i.e. the first derivative in time of the current torsion $\Delta\theta$).

The target torsion $\Delta\theta_{targ}$ of the powertrain system 3 is supplied to a further calculation block 24, which according to the target torsion $\Delta\theta_{targ}$ is capable of determining the requested torque $T_{e\text{-}EC}$ on the basis of the energy balance. In other words, the algorithm implemented in the calculation block 24 is based on the energy balance which allows to obtain the following equation:

$$T_{e,EC} = \frac{J_e + J_v}{J_v} \cdot \left[\frac{E(\Delta\vartheta_{targ}, 0) - E(\Delta\vartheta, \Delta\vartheta')}{\Delta\vartheta_{targ} - \Delta\vartheta} - \frac{J_e}{J_e + J_v} \cdot T_r + b \cdot \Delta\vartheta'\right]$$

$T_{e\text{-}EC}$ requested torque on the basis of the energy balance [Nm];
$J_e$ moment of inertia of the internal combustion engine 4 transmitted to the drive shaft 5 [kg m$^2$];
$J_v$ moment of inertia of the car 1 transmitted to the drive shaft 5 [kg m$^2$];
$E(\Delta\theta, \Delta\theta')$ function which renders the total mechanical energy of the powertrain system 3 [J];
$\Delta\theta_{targ}$ target torsion of the powertrain system 3 [rad];
$\Delta\theta$ current torsion of the powertrain system 3 transmitted to the drive shaft 5 [rad];
$\Delta\theta'$ current torsion speed of the powertrain system 3 transmitted to the drive shaft 5 [rad/s];
b damping coefficient of the powertrain system 3 [Nm/s];
$T_r$ current load torque of the car 1 referred to the drive shaft 5 [Nm].

The function $E(\Delta\theta, \Delta\theta')$ which renders the total mechanical energy of the powertrain system 3 (i.e. the sum of the inertia energy and of the elastic torsional energy of the powertrain system 3) is based on the following equation:

$$E(\Delta\vartheta, \Delta\vartheta) \equiv \frac{1}{2} \cdot \frac{J_e J_v}{J_e + J_v} \cdot \Delta\vartheta'^2 + V(\Delta\vartheta)$$

$E(\Delta\theta, \Delta\theta')$ total mechanical energy of the powertrain system 3 [J];
$J_e$ moment of inertia of the internal combustion engine 4 transmitted to the drive shaft 5 [kg m$^2$];

$J_v$ moment of inertia of the car 1 transmitted to the drive shaft 5 [kg m$^2$];

$\Delta\theta$ current torsion of the powertrain system 3 transmitted to the drive shaft 5 [rad];

$\Delta\theta'$ current torsion speed of the powertrain system 3 transmitted to the drive shaft 5 [rad/s];

$V(\Delta\theta)$ function which provides the elastic torsional energy of the powertrain system 3 [J].

The calculation block 24 determines the requested torque $T_{e\text{-}EC}$ on the basis of the above-described energy balance outside singularity zone I indicated by the following expression:

$$(\Delta\theta, \Delta\theta') \epsilon I, I \equiv \{(\Delta\theta, \Delta\theta'): |\Delta\theta_{targ} - \Delta\theta| < \Theta_{switch}, |\Delta\theta'| < \Psi_{switch}\}$$

$\Delta\theta$ current torsion of the powertrain system 3 transmitted to the drive shaft 5 [rad];

$\Delta\theta'$ current torsion speed of the powertrain system 3 transmitted to the drive shaft 5 [rad/s];

$\Delta\theta_{targ}$ target torsion of the powertrain system 3 [rad];

$\Theta_{switch}$ first threshold value;

$\Psi_{switch}$ second threshold value.

In other words, calculation block 24 determines the requested torque $T_{e\text{-}EC}$ on the basis of the energy balance described above only when the difference between the target torsion $\Delta\theta_{targ}$ is significantly different from the current torsion $\Delta\theta$ and the current torsion speed $\Delta\theta'$ is significantly different from zero.

When the calculation block 24 is no longer capable of determining the requested torque $T_{e\text{-}EC}$ on the basis of the above-described energy balance, a calculation block 25 determines the requested torque $T_{e\text{-}CL}$ on the basis of the maximum damping, for example by using the following equation:

$$T_{e\text{-}CL} = T_{e\text{-}targ} - G_i \cdot \Delta\theta'$$

$T_{e\text{-}CL}$ requested torque on the basis of the maximum damping [Nm];

$T_{e\text{-}targ}$ target torque [Nm];

$G_i$ damping constant;

$\Delta\theta'$ current torsion speed of the powertrain system 3 transmitted to the drive shaft 5 [rad/s].

The value of the damping constant $G_i$ may be variable according to the drive axle and is proportional to the desired damping degree.

The requested torque $T_{e\text{-}EC}$ on the basis of the energy balance and the requested torque $T_{e\text{-}CL}$ on the basis of the maximum damping are supplied to coordinator 26, which also receives the target torque $T_{e\text{-}targ}$ and has the function of selecting which inputted torque to be use as set-point torque $T_{e\text{-}sp}$ which is directly supplied to the controller 16 (as previously described). During the first instants of a transient triggered by a change of the requested torque $T_{e\text{-}rqst}$, the requested torque $T_{e\text{-}EC}$ on the basis of the energy balance is used as set-point torque $T_{e\text{-}sp}$, while when the transient triggered by a change of the requested torque $T_{e\text{-}rqst}$ is close to being exhausted (i.e. the current torsion $\Delta\theta$ is close to the target torsion $\Delta\theta_{targ}$ and the current torsion speed $\Delta\theta'$ is slow), the requested torque $T_{e\text{-}CL}$ on the basis of the maximum damping is used as set-point torque $T_{e\text{-}sp}$; finally, when the transient triggered by a change of the requested torque $T_{e\text{-}rqst}$ is exhausted (i.e. the current torsion $\Delta\theta$ is equal to the target torsion $\Delta\theta_{targ}$ and the current torsion speed $\Delta\theta'$ is null), the target torque $T_{e\text{-}targ}$ is used as set-point torque $T_{e\text{-}sp}$. It is worth noting that that coordinator 26 also receives the current torsion $\Delta\theta$ and the current torsion speed $\Delta\theta'$ in order to determine when to use the requested torque $T_{e\text{-}EC}$ on the basis of the energy balance and when to use the target torque $T_{e\text{-}targ}$.

The above-described control strategy of the torque generated by the internal combustion engine 4 in case of transient triggered by a change of requested torque $T_{e\text{-}rqst}$ presents many advantages because it is simple and cost-effective to implement in a modern car 1 (i.e. does not require the installation of additional components with respect to those already normally present) and is above all concurrently effective (i.e. capable of completely eliminating the longitudinal acceleration oscillations of the car 1) and efficient (i.e. does not affect the dynamic performance of the car 1 because it is capable of minimising the transient time). Simulations have demonstrated that the above-described control strategy of the torque generated by the internal combustion engine 4 in the case of transient triggered by a change of the requested torque $T_{e\text{-}rqst}$ is capable of halving the transient time with respect to a traditional control strategy based only on a maximum damping algorithm.

What is claimed:

1. A control method of the torque of a road vehicle comprising a powertrain system provided with an engine presenting a drive shaft and a driveline which transmits the torque generated by the engine to the road surface through the drive wheels; the method comprises the steps of:

determining a target torque ($T_{e\text{-}targ}$); and controlling the generation of torque by the engine on the basis of the target torque ($T_{e\text{-}targ}$);

the method is characterized in that it comprises the further steps of:

modeling the powertrain system as a single physical component which presents a characteristic mechanical inertia and a characteristic torsional elasticity and which must undergo a corresponding torsion to transmit a certain drive torque;

determining a current load torque ($T_r$) of the vehicle;

determining a target torsion ($\Delta\theta_{targ}$) of the powertrain system according to the target torque ($T_{e\text{-}targ}$) and the current load torque ($T_r$);

determining a current torsion ($\Delta\theta$) of the powertrain system and a current torsion speed ($\Delta\theta'$) of the powertrain system;

determining a requested torque ($T_{e\text{-}EC}$) on the basis of the energy balance according to the target torsion ($\Delta\theta_{targ}$), the current torsion ($\Delta\theta$), the current torsion speed ($\Delta\theta'$), and the current load torque ($T_r$); and using the requested torque ($T_{e\text{-}EC}$) on the basis of the energy balance to control the torque generation of the engine.

2. A method according to claim 1, wherein the target torsion ($\Delta\theta_{targ}$) is calculated by means of the following equation:

$$\Delta\theta_{targ} = f_{Tw}^{-1}\left(\frac{J_v}{J_e + J_v} \cdot T_{e\text{-}targ} + \frac{J_e}{J_e + J_v} \cdot T_r\right)$$

$\Delta\theta_{targ}$ target torsion of the powertrain system [rad];

$f_{Tw}(\Delta\theta)$ function which renders the elastic reaction torque of the powertrain system [Nm];

$J_e$ moment of inertia of the internal combustion engine transmitted to the drive shaft [kg m$^2$];

$J_v$ moment of inertia of the vehicle transmitted to the drive shaft [kg m$^2$];

$T_{e\text{-}targ}$ target torque [Nm];

$T_r$ current load torque of the vehicle transmitted to the drive shaft [Nm].

3. A method according to claim 1, wherein the requested torque ($T_{e\text{-}EC}$) on the basis of the energy balance is calculated by means of the following equation:

$$T_{e,EC} = \frac{J_e + J_v}{J_v} \cdot \left[ \frac{E(\Delta\vartheta_{targ}, 0) - E(\Delta\vartheta, \Delta\vartheta')}{\Delta\vartheta_{targ} - \Delta\vartheta} - \frac{J_e}{J_e + J_v} \cdot T_r + b \cdot \Delta\vartheta' \right]$$

$T_{e\text{-}EC}$ requested torque on the basis of the energy balance [Nm];
$J_e$ moment of inertia of the internal combustion engine transmitted to the drive shaft (5) [kg m$^2$];
$J_v$ moment of inertia of the vehicle transmitted to the drive shaft [kg m$^2$];
$E(\Delta\theta, \Delta\theta')$ function which renders the total mechanical energy of the powertrain system [J];
$\Delta\theta_{targ}$ target torsion of the powertrain system [rad];
$\Delta\theta$ current torsion of the powertrain system transmitted to the drive shaft [rad];
$\Delta\theta'$ current torsion speed of the powertrain system transmitted to the drive shaft (5) [rad/s];
b damping coefficient of the powertrain system [Nm/s];
$T_r$ current load torque of the vehicle referred to the drive shaft [Nm].

4. A method according to claim 3, wherein the function $E(\Delta\theta, \Delta\theta')$ which renders the total mechanical energy of the powertrain system is based on the following equation:

$$E(\Delta\vartheta, \Delta\vartheta') \equiv \frac{1}{2} \cdot \frac{J_e J_v}{J_e + J_v} \cdot \Delta\vartheta'^2 + V(\Delta\vartheta)$$

$E(\Delta\theta, \Delta\theta')$ total mechanical energy of the powertrain system [J];
$J_e$ moment of inertia of the internal combustion engine transmitted to the drive shaft (5) [kg m$^2$];
$J_v$ moment of inertia of the vehicle transmitted to the drive shaft [kg m$^2$];
$\Delta\theta$ current torsion of the powertrain system transmitted to the drive shaft [rad];
$\Delta\theta'$ current torsion speed of the powertrain system transmitted to the drive shaft [rad/s];
$V(\Delta\theta)$ function which provides the elastic torsional energy of the powertrain system [J].

5. A method according to claim 3, wherein the requested torque ($T_{e\text{-}EC}$) on the basis of the energy balance is determined only when the difference between the target torsion ($\Delta\theta_{targ}$) is significantly different from the current torsion ($\Delta\theta$) and the current torsion speed ($\Delta\theta'$) is significantly different from zero and thus outside the singularity zone (I) indicated by the following expression:

$(\Delta\theta, \Delta\theta') \in I, I \equiv \{(\Delta\theta, \Delta\theta'): |\Delta\theta_{targ} - \Delta\theta| < \Theta_{switch}, |\Delta\theta'| < \Psi_{switch}\}$ $\Delta\theta$ current torsion of the powertrain system transmitted to the drive shaft [rad];
$\Delta\theta'$ current torsion speed of the powertrain system transmitted to the drive shaft [rad/s];
$\Delta\theta_{targ}$ target torsion of the powertrain system [rad];
$\Theta_{switch}$ first threshold value;
$\Psi_{switch}$ second threshold value.

6. A method according to claim 5, and comprising the further steps of:
determining, within the singularity zone (I), a requested torque ($T_{e\text{-}CL}$) on the basis of the maximum damping; and
using the requested torque ($T_{e\text{-}CL}$) on the basis of the maximum damping to control the generation of engine torque (4).

7. A method according to claim 6, wherein the requested torque ($T_{e\text{-}CL}$) on the basis of the maximum damping is calculated by means of the following equation:

$T_{e\text{-}CL} = T_{e\text{-}targ} - G_i \cdot \Delta\theta'$ $T_{e\text{-}CL}$ requested torque on the basis of the maximum damping [Nm];
$T_{e\text{-}targ}$ target torque [Nm];
$G_i$ damping constant;
$\Delta\theta'$ current torsion speed of the powertrain system transmitted to the drive shaft [rad/s].

8. A method according to claim 6, and comprising the further steps of:
using the requested torque ($T_{e\text{-}EC}$) on the basis of the energy balance to control the torque generation of the engine during the first instants of a transient triggered during a change of the target torque ($T_{e\text{-}targ}$);
using the requested torque ($T_{e\text{-}EC}$) on the basis of the maximum damping to control the torque generation of the engine when the transient triggered by a change of the target torque ($T_{e\text{-}targ}$) is close to being exhausted; and
using the target torque ($T_{e\text{-}targ}$) for controlling the torque generation of the engine when the transient triggered by a change of the target torque ($T_{e\text{-}targ}$) is exhausted.

9. A method according to claim 1 and comprising the further step of determining the current torsion ($\Delta\theta$), the current torsion speed ($\Delta\theta'$), and the current load torque ($T_r$) by means of an observer (23) which receives as input an effective torque ($T_e$) generated by the engine and a number (N) of revolutions of the engine.

10. A method according to claim 1 and comprising the further steps of:
determining a torque ($T_{e\text{-}rqst}$) requested by a driver or by an automatic cruise control;
limiting the requested torque ($T_{e\text{-}rqst}$) within a range, which comprises a minimum torque ($T_{min}$) and maximum torque ($T_{max}$) and takes the physical limits of the engine into account;
filtering the limited requested torque ($T_{e\text{-}rqst}$) by means of a low-pass type filter to obtain a requested and filtered torque ($T_{fil}$); and
determining the target torque ($T_{e\text{-}targ}$) as the maximum between the requested and filtered torque ($T_{fil}$) and an idling torque ($T_{idle}$).

* * * * *